United States Patent Office 3,469,111
Patented Sept. 23, 1969

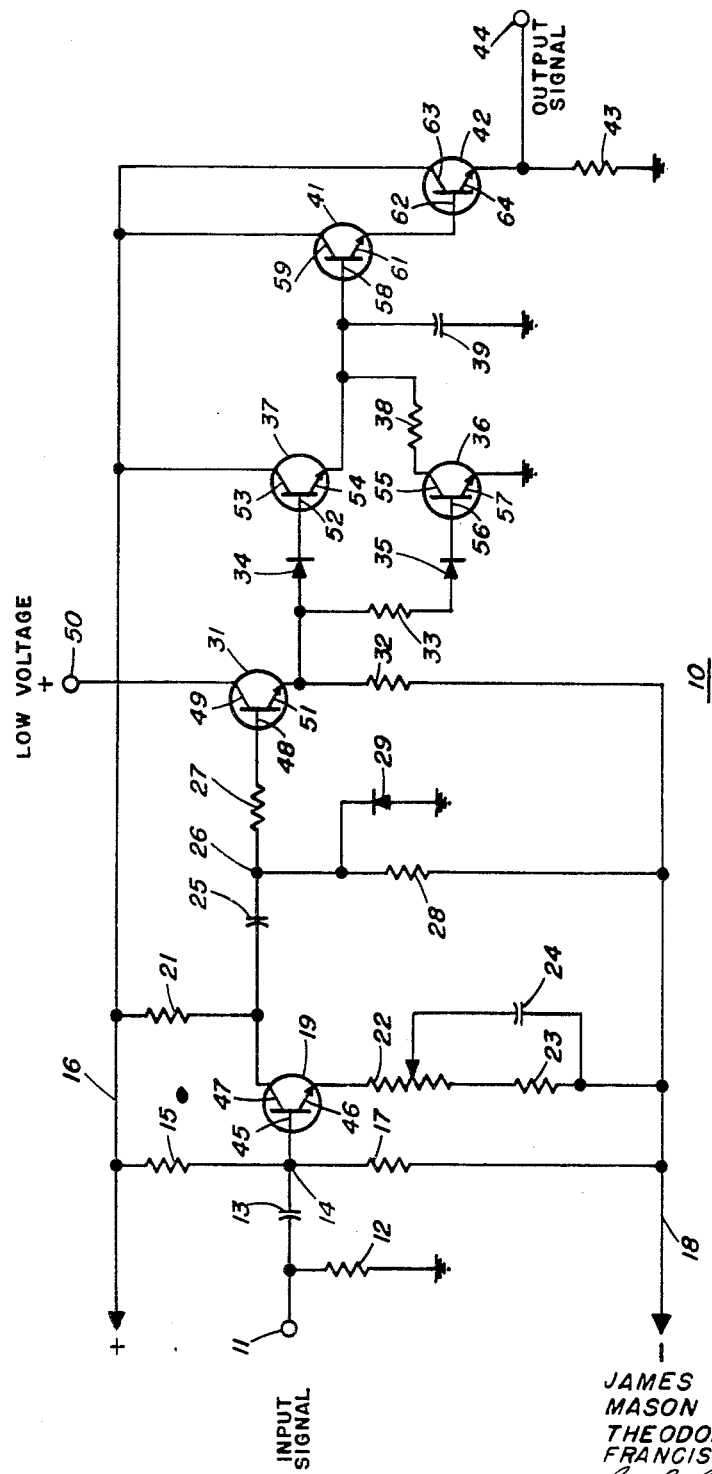
INVENTORS
JAMES PETERS
MASON A. CLIFT, JR.
THEODORE B. STAGG, JR.
FRANCIS E. DAVIS, JR.
BY
ATTORNEY
AGENT

3,469,111
PEAK DETECTOR CIRCUIT FOR PROVIDING AN OUTPUT PROPORTIONAL TO THE AMPLITUDE OF THE INPUT SIGNAL
James Peters and Mason A. Clift, Jr., Baltimore, Theodore B. Stagg, Jr., Towson, and Francis E. Davis, Jr., Laurel, Md., assignors, by mesne assignments, to the United States of America as represented by the Secretary of the Navy
Filed Apr. 29, 1966, Ser. No. 547,071
Int. Cl. H03k 5/20
U.S. Cl. 307—235     3 Claims

ABSTRACT OF THE DISCLOSURE

The invention is directed to a peak detector circuit which provides a direct current output voltage that is proportional to the amplitude of the input pulses. The input pulse is first amplified by a video amplifier and the alternating component of signal is fed to the input of an emitter follower through an alternating current coupler. A direct current restoration circuit restores the direct current component of the signal at the emitter follower. Output means utilizing first and second parallel connected transistors and a capacitor are connected to the output of the emitter follower and are operable to vary the charge on the capacitor in proportion to the output of the emitter follower. A Darlington configuration circuit is connected to the capacitor and the output of the peak detector is taken across this circuit.

---

This invention relates to detectors and more particularly to a peak detector circuitry that provides a direct current voltage output which is proportional to amplitude changes occurring in a recurrent pulse train input signal.

Military applications of radar, radar detection systems, and pulse techniques have created a wide interest in these various types of pulse circuitry devices. With the advent of new radar sets and new pulse circuitry systems, new methods of measuring the performance of these circuitries is needed in order to provide meaningful characteristic data from performance tests necessary for the evaluation of these circuitry systems. In numerous situations it is desirable to measure trains of periodic pulses and obtain a direct current output voltage that is proportional to the amplitude changes occurring in these pulse trains. In addition, in some environments it is desirable to have a single pulse measuring circuitry that can handle wide ranges of input pulse duty cycles. Prior art circuits are usually deficient in these respects and in the case of operating over a wide duty cycle range usually requires a number of individual circuits designed to operate so as to cover predetermined regions of the duty cycle range desired. This technique ordinarily is undesirable in most applications because it requires some means of switching between the various stages of the peak detector circuitry. This complicates the circuitry arrangement and in addition may cause erroneous readings to be obtained because of improper operation of switching sequence during the duty cycle.

The peak detector circuitry of the instant invention has none of the disadvantages of the peak detector systems of the prior art, in that, it is capable of operation either at high or low duty cycles of input powers and in addition is not limited to detection of pulses of a fixed repetition rate but will detect pulses that have large deviations from one another with respect to pulse repetition rates and pulse widths. The invention may find application in numerous pulse system applications where it is desirable to close an automatic gain control loop or it may be utilized in a measuring circuitry to produce a direct current output from a periodically repeated signal that is proportional to amplitude variations occurring in this signal.

An object of the present invention is the provision of an electronic circuitry arrangement that provides a direct current voltage output that is proportional to amplitude changes occurring in the input signal.

Another object of the present invention is the provision of a detection circuitry arrangement that operates over a wide range of pulse repetition rates and pulse widths.

Still another object of the present invention is the provision of a peak detector circuitry that is capable of operation at both high and low input duty cycles.

A further object of the present invention is the provision of a peak detector circuitry that has the same output power amplitude as the power at the input to the peak detector circuitry.

A further object of the present invention is the provision of a peak detector circuitry that does not require a pulse transformer and therefore eliminates the necessity of providing balancing circuitry normally required for this method of detection.

Other objects, advantages and novel features of the invention will become apparent from the following detailed description of the invention when considered in conjunction with the accompanying drawings wherein:

The figure illustrates a schematic diagram of the peak detector circuitry arrangement of the present invention.

Referring now to the figure where there is shown a schematic diagram of the peak detector circuitry, indicated generally as numeral 10, which has an input terminal 11 and a noutput signal terminal 44. The input signal terminal 11 is connected to an impedance matching resistor 12 which in turn is connected so that the input signal appears across this resistance to ground potential. Transistor 19 is operatively interconnected to the various circuit components as a video amplifier stage. Transistor 19 is an NPN transistor that has a base 45, an emitter 46, and a collector 47. The base 45 is capacitively coupled to impedance matching resistor 12 by means of coupling capacitor 13 via junction 14. Resistances 15 and 17 are series coupled together at junction 14 and together form a resistive voltage divider network across positive potential line 16 to negative low voltage potential line 18. The emitter 46 is electrically coupled to negative low voltage potential line 18 by means of adjustable resistance 22 and series resistor 23. The adjustable arm of resistor 22 is coupled to one side of a bypass capacitor 24 that has its other side connected to line 18. This adjustable arm arrangement permits adjustment of emitter current flow by shorting out a predetermined portion of resistor 22. The collector 47 is coupled to positive high voltage line 16 via collector resistor 21. Transistor 31 has a base 48, an emitter 51 and a collector 49. The amplified output current from transistor 19 is capacitively and resistively coupled to a transistor 31 which is coupled to associated circuitry elements to form an emitter follower stage. This is accomplished by having one side of capacitor 25 connected to collector 47 and its other side is coupled to a series resistance 27 that is electrically connected to base 48. Junction 26 is formed by coupling capacitor 25 and resistor 27 together. Also electrically connected to junction 26 is resistor 28 and diode 29 which serve as a direct current restoring circuit. Resistor 28 is coupled at its other side to the negative low voltage potential line 18. Diode 29 is coupled at its other side to ground potential. Emitter 51 is coupled to line 18 via emitter resistance 32 and the collector of transistor 31 is directly coupled to positive low voltage terminal 50.

The output signal appears across emitter resistor 32 and this output is electrically coupled to transistors 36 and 37.

Transistors 36 and 37 are electrically coupled by means of associated electrical elements in a demodulator circuitry configuration. Transistor 37 comprises base 52, emitter 54, and collector 53. Base 52 is electrically coupled to emitter resistance 32 by means of diode 34, the collector 53 is directly tied to positive potential line 16 and the emitter 54 is electrically coupled to two output transistors 41 and 42, respectively. Storage capacitance 39 is electrically connected between emitter 54 and resistor 38 to ground potential. Transistor 36 is coupled in parallel circuitry configuration with transistor 37. Transistor 37 has a base 56, emitter 57 and a collector 55. The parallel arrangement is accomplished by electrically coupling base 56 to emitter 51 by means of series resistance 33 and diode 35. The collector 55 is coupled by means of collector resistance 38 to emitter 54 and the emitter 57 is directly coupled to ground potential.

The Darlington circuitry arrangement has two direct coupled transistors 41 and 42. These transistors have base emitter and collector terminals 58, 61, 59 and 62, 64 and 63, respectively. The respective collectors 59 and 63 of transistors 41 and 42, respectively, are directly coupled to line 16. Emitter 61 is directly coupled to base 62 and emitter 64 is coupled to emitter resistor 43. The output signal appearing at terminal 44 may be taken from across emitter resistor 43 and ground potential and coupled to utilization circuitry (not shown).

In operation, the input signal appears across resistor 12 which has been chosen to match the output impedance of the previous stage; for example, a video detector stage in any type of pulse system circuitry. The input signal is then coupled to transistor 19 by means of coupling capacitor 13. The quiescent bias point for transistor 19 is established by means of the values selected for resistors 15 and 17, respectively. The emitter adjustable resistor 22, series resistors 23 and collector resistor 21 values are also chosen to provide the quiescent point and gain of transistor 19 which is electrically coupled into the overall circuitry by means of these components to form a video amplifier stage. The video amplifier stage as shown may be modified by means of techniques known to those skilled in the art to handle different types of input pulses such as positive pulses or pulses of different amplitude by proper selection of associated electrical components.

The amplified signal that appears across collector resistor 21 is coupled to the base 48 of the emitter follower stage by means of a coupling network formed of capacitor 25 and resistor 27. The signal output from the emitter follower stage, transistor 31, is taken from across emitter resistor 32 and coupled to base 52 by means of diode 34. Transistors 37 and 36 are normally non-conducting. As the first pulse of this signal reaches base 52 transistors 37 and 36 will conduct. Under these conditions the demodulator circuitry in this instant appears as a second emitter follower stage and the output from the emitter 54 will charge capacitance 39 to the peak value of the pulse with no discharge path available to discharge capacitor 39. If the next pulse appearing at base 52 is of greater amplitude than the first pulse both transistors 37 and 36, respectively, will again conduct and the capacitor 39 is charged to a new peak value. Now, assuming on the other hand, that the third pulse appearing at base 52 is of lesser amplitude than the preceding two pulses. Under this condition transistor 37 will not conduct since it is back biased, but transistor 36 will conduct to provide a discharge path for storage capacitor 39 through resistor 38. When the voltage on the capacitor becomes less than the value of the pulse on the base of transistor 37, transistor 37 will again conduct and the capacitor 39 will charge to the new amplitude of the pulse. The resultant direct current signal is then passed through a Darlington circuit configuration, transistors 41 and 42, respectively, to appear across resistor 43 and this output is directly proportional to the pulse amplitude.

The operation of the direct current restoring circuitry, is such that the direct current component of signal is restored to the alternating current component at the base of emitter follower transistor 31. During the negative going portion of the signal at collector 47 of transistor 19, capacitor 25 is charged to the negative peak value. During the positive going portion of the signal the charge is added to the positive signal and appears across resistor 28 clamped to ground potential.

The direct current component for any periodic signal is given by the formula $$v_{dc} = \langle v \rangle = \frac{1}{T} \int_0^T v(t) dt \qquad (1)$$

where T is the period. When solved this becomes $$v_{dc} = A \frac{\tau}{T} \qquad (2)$$

where:

A = pulse
$\tau$ = pulse width

Defining the duty cycles as $\tau/T$ and solving numerically for $v_{dc}$ for the two modes of operation for the peak circuitry, will give the direct currents at these particular modes. Ordinarily the direct current component of the input signal would be lost when alternating current coupling is employed between circuitry stages and the use of a single circuit for both duty cycle conditions would result in large errors. However, the restoration circuit embodied in resistor 28 and diode 29; and its associated electrical components restores all of the direct component of the signal except for the small voltage drop that appears across diode 29. The amount of error introduced is dependent upon the diode used. Therefore, if diode 29 is a germanium switching diode rather than a silicon diode, it would reduce the error between the high duty and low duty modes from a substantially high percentage to a lower percentage because of the inherent lower voltage drop across the germanium diode.

The present invention disclosed provides an effective circuitry for measuring recurrent pulse trains and obtaining a direct current output that is proportional to the individual pulse amplitudes. This may be accomplished at substantially different input power signals without appreciable errors in the direct current measured at the output terminals of the circuitry due to the utilization of the restoration circuitry. The above characteristic of the circuitry permits the use of a single circuitry rather than the use of separate circuitries at various power input signal levels. Also, the instant circuitry is not dependent upon threshold level in that it gives a power output that varies in proportion to the input rather than a fixed maximum power output once the threshold level is reached. In addition, the peak detector circuitry is readily adaptable for use with many typical radar and pulse circuitry applications and has extensive application in closed loop automatic gain control circuitry.

Obviously many modifications and variations of the present invention are possible in the light of the above teachings. It is therefore to be understood that within the scope of the appended claims the invention may be practiced otherwise than as specifically described.

What is claimed is:

1. A peak circuitry apparatus that accepts recurrent pulse input signals over a wide range of pulse repetition and pulse widths for providing a direct current voltage output which is proportional to the amplitude changes of the input signal comprising:

input amplifier means for increasing the signal level of said pulse input signals;

alternating current coupling means connected to the output of said input amplifier;

an output means;

an emitter follower circuit including first potential source means and a first transistor having a base, emitter and collector, the base of said transistor being connected to said alternating current coupling means, the collector of said transistor being connected to said first potential source means, and the emitter of said transistor being connected to said output means;

second potential source means;

a diode connected between said second potential means and said alternating current coupling means; and a resistor connected between said amplifier and said alternating current coupling means;

said second potential source, said diode and said resistor being operative to restore the direct current components of the input signals; and first and second parallel connected output transistors of the same conductivity type connected to receive the output of said emitter follower and a capacitor connected to said transistors to yield said proportional signal.

2. The peak circuitry apparatus of claim 1 wherein said output means comprises:

third and fourth potential source means, capacitive means, a first output transistor having an emitter, collector and base; and a second output transistor having an emitter, collector and base:

the bases of said first and second output transistors being connected to the output of said emitter follower;

the emitter of said first output transistor and the collector of said second output transistor being connected to said capacitive means;

the emitter of said second output transistor and said capacitive means being connected to said third source of potential; and the collector of said first output transistor being connected to said fourth source of potential.

3. The peak circuitry apparatus of claim 2 wherein said output means further comprises:

a Darlington configuration circuit connected to said capacitive means.

References Cited

UNITED STATES PATENTS

| | | | |
|---|---|---|---|
| 2,466,705 | 4/1949 | Hoeppner | 330—34 XR |
| 2,708,736 | 5/1955 | Creveling et al. | 329—109 XR |
| 3,002,154 | 9/1961 | Schmitz et al. | 329—109 |
| 3,119,029 | 1/1964 | Russell | 307—254 XR |

OTHER REFERENCES

"Peak Detecting Circuit," in IBM Technical Disclosure Bulletin, vol. 6, No. 10, dated March 1964, pp. 92–93.

ARTHUR GAUSS, Primary Examiner

S. D. MILLER, Assistant Examiner

U.S. Cl. X.R.

307—237, 246, 264, 315; 328—151; 329—102, 109